(12) United States Patent
O'Toole, Jr.

(10) Patent No.: US 7,287,082 B1
(45) Date of Patent: Oct. 23, 2007

(54) SYSTEM USING IDLE CONNECTION METRIC INDICATING A VALUE BASED ON CONNECTION CHARACTERISTIC FOR PERFORMING CONNECTION DROP SEQUENCE

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 873 days.

(21) Appl. No.: 10/378,405

(22) Filed: Mar. 3, 2003

(51) Int. Cl.
*G06F 15/16* (2006.01)

(52) U.S. Cl. ............... 709/228; 709/227; 709/223; 709/224

(58) Field of Classification Search ........... 709/227, 709/228, 229, 225, 203, 226, 223, 224; 726/5; 719/310; 370/395.1
See application file for complete search history.

(56) References Cited

U.S. PATENT DOCUMENTS

| | | | |
|---|---|---|---|
| 6,125,401 A * | 9/2000 | Huras et al. ............... 719/310 |
| 6,539,481 B1 * | 3/2003 | Takahashi et al. ............ 726/5 |
| 6,598,082 B1 * | 7/2003 | Douglis et al. ............ 709/227 |
| 2002/0112054 A1 * | 8/2002 | Hatanaka .................... 709/225 |
| 2002/0169820 A1 * | 11/2002 | Sayan et al. ................ 709/203 |
| 2004/0088413 A1 * | 5/2004 | Bhogi et al. ................ 709/226 |
| 2004/0213255 A1 * | 10/2004 | Brinkerhoff et al. ...... 370/395.1 |

\* cited by examiner

*Primary Examiner*—Le Hien Luu
(74) *Attorney, Agent, or Firm*—Chapin IP Law, LLC; Barry W. Chapin, Esq.

(57) ABSTRACT

Idle connections are processed in a computerized device in order to improve the efficiency of at least one server where the computerized device monitors a set of connections coupled to the at least one server for idle connections. The computerized device maintains an idle connection metric for each idle connection in the set of connections. The computerized device detects an idle drop condition to drop idle connections from the set of connections. In response to detecting an idle drop condition, the computerized device performs a connection drop sequence according to a connection drop policy based on the idle connection metric for each idle connection.

32 Claims, 8 Drawing Sheets

SYSTEM USING IDLE CONNECTION METRIC INDICATING A VALUE BASED ON CONNECTION CHARACTERISTIC FOR PERFORMING CONNECTION DROP SEQUENCE

BACKGROUND OF THE INVENTION

In a computer network, client computers establish connections to servers in order to communicate, e.g. a client computer establishes a connection to a server over the Internet in order to download a web page. Each client connection to the server uses a portion of server resources such as processing time and memory even when the connection is idle, that is, when there is no data being transmitted over the connection. A server typically handles large numbers of connections, and because each connection consumes server resources, the overall server response can degrade when there are many connections to handle.

In order to maintain server efficiency and effectively respond to client requests, servers generally have processes for handling connections. A typical process includes a procedure for closing connections after the connections are no longer useful. One conventional process in servers for handling connections includes a policy to drop a connection as soon as a response to a client request is transmitted. For example, where the client makes a request, the client and server establish a connection, the server provides the data in a response to the client and then the server closes the connection.

Newer computer protocols, such as Hypertext Transport Protocol (HTTP) 1.1 and above, allow persistent connections, that is, connections that do not close immediately after a server response, but instead remain in place in order to enable additional transactions between the client and server without the step of reestablishing a new connection for each additional transaction. For example, the HTTP 1.1 GET request includes a keepalive, which is a directive to maintain the client-server connection. A keepalive typically includes a time-out period after which the server may drop the persistent connection. Persistent connections have also been implemented in order to accommodate data communications devices in computer networks that maintain connection states between clients and servers. For example, load balancing devices direct client connections to particular servers in a group of servers according to a policy aimed at balancing load among the servers in the group. Persistent connections enable a client to establish a first connection to a load balancing device and then enable the load balancing device to establish a second connection from itself to a server.

In some ways, persistent connections increase server efficiency because server resources are not spent reestablishing connections with clients in order to conduct additional transactions. For example, in downloading a web page having many connections, which is typical in a graphical web page, a persistent connection to the server enables the client to make multiple requests over the same connection in order to get a complete web page over the one connection rather than having to establish a new connection for each request. Thus, persistent connections significantly improve download time for graphical web pages.

Persistent connections generally tend to accumulate at the server. One of the reasons that idle connections may accumulate at the server is that client web browsers typically allow up to four connections to servers at one time. A client could, for example, establish four persistent connections to a server and then move on to a different server using one of the four connections, leaving behind three persistent connections until a connection time-out period has elapsed within the server still maintaining the three connections.

Persistent connections can make load balancing difficult. For example, if a client sends a second request on an existing connection to a first server through a load balancing device, but the load balancing device determines that another server should service the second request, the load balancing device needs to have a process to enable the client to communicate with the other server. There are some conventional solutions to this problem.

In a first conventional system, a data communications device, such as a load balancer, maintains connections between a client and a server. In this conventional system, the data communications device drops the connection to the server when the client moves to a different server. That is, the data communications device establishes a connection with a server in response to a client request. The client then makes a second request that includes connecting to another server, the data communications device closes the connection to a first server established for the first request and establishes a new connection to the other server. This system reduces the accumulation of idle connections to servers.

In a second conventional system, a data communications device maintaining connections with both clients and servers, such as a load balancing device, reuses existing connections. That is, the data communications device establishes a set of persistent connections to multiple servers in response to prior client requests. When a current client requests a different server or a new client requests a connection to one of the servers, the data communications device preferably uses an existing idle connection to enable the client to communicate with the requested server. The data communications device creates a new connection when there are no available connections to the requested server.

This system diminishes the number of new connections from the data communications device to the servers (the "back side") that would otherwise be created to handle client requests. There could still be many client connections between clients and the data communications device. The system therefore enables the data communications device to conserve back side connections and to conserve server resources. One alternative embodiment of this conventional system includes a limit to the number of back side server connections, for example to one hundred connections.

SUMMARY OF THE INVENTION

Conventional computer network technology does not provide an efficient way to handle persistent connections so that persistent connections are maintained where those connections are useful and are closed where the connections are no longer useful.

As an example, the first conventional system discussed above in which the data communications device drops a persistent connection after receiving a subsequent client request for a different server does not fulfill a goal of managing idle connections to improve server utilization. The first conventional system reduces accumulation of idle connections under a limited circumstance but does not handle idle connections outside that situation. The idle connections that are created as a result of a single client request remain until the time-out period elapses. Also, there is no mechanism to drop idle connections if the server becomes busy with active connections.

The second conventional system discussed above in which existing connections are reused where possible, also does not fulfill the goal of managing idle connections to improve server utilization. Rather, the second conventional system conserves the number of overall connections created. If, however, back side connections are not closed, the system has a potential of entering a state where all the back side connections are idle and establishment of new connections is substantially delayed. Also, the second conventional system defeats a Transmission Control Protocol (TCP) slow-start mechanism. The TCP slow-start mechanism is used to prevent network congestion. When a client is newly connected to a server, the TCP process implementing the slow-start mechanism maintains data transfer at a slow speed in order to avoid overwhelming a client having limited resources such as a slow network connection. As time passes, the TCP process in the server notes the capabilities of the client and increases speed of data transfer over the connection generally until the TCP process finds a limit of client capability. That is, data is delivered at an increasingly faster rate over the connection to that client until packets begin to be dropped. In the second conventional system, the established back side server connections may already be in fast mode if, for example, the connections have been used to connect to fast clients. The second conventional system does not notify the back side server connections that a different client is attached at the front. The second conventional system does not slow down the existing connection for a new client. If a slow client is connected to (i.e., reuses) a fast connection, the slow client may receive data at an overwhelming speed and be unable to handle all packets. In addition, reusing back side connections for different clients confuses log file data. Log files regarding transactions between clients and servers over particular connections in the second conventional system would have transactions that are not actually related. This means that assumptions that may generally be made in server software about communication to a same client in order to improve efficiency of communication are not necessarily valid.

It remains desirable to have a method and apparatus capable of taking advantage of persistent connections to maintain efficient server utilization while avoiding the disadvantages of persistent connections found in conventional systems. In particular, it remains desirable to have a system and method for selective reduction of idle connections so that the existing pool of connections does not delay incoming connections. Embodiments of the present invention significantly overcome the deficiencies described above and provide methods and apparatus for selectively reducing idle connections to improve computerized device utilization.

In the present invention, an idle connection reduction device selectively reduces the number of idle connections in a computerized device handling connections in a network. The computerized device, for example, could be a server, a load balancer, a router or a switch. In operation, the idle connection reduction device monitors the connections in the computerized device and maintains idle connection metrics for the connections. An example of an idle connection metric is an idle timer for each connection. When the idle connection reduction device detects a condition indicating that idle connections should be dropped, the idle connection reduction device selectively drops connections from the set of connections according to an idle connection drop policy based on the idle connection metrics.

More specifically, embodiments of the invention provide methods and apparatus for improving the efficiency of at least one server. One such method embodiment is implemented in a computerized device and comprises the step of monitoring a set of connections coupled to at least one server for idle connections. The method then includes the step of maintaining an idle connection metric for each idle connection in the set of connections. The method then continues with the step of detecting an idle drop condition to drop idle connections from the set of connections. The method then, in response to detecting the idle drop condition, further includes the step of performing a connection drop sequence according to a connection drop policy based on the idle connection metric for each idle connection. Therefore, the computerized device, by applying the connection drop policy to the idle connections as a set is able to selectively drop idle connections in order to maintain valued idle connections and drop less-valued idle connections to enable new connections and maintain server efficiency.

In one embodiment of the invention, the step of maintaining an idle connection metric involves associating an idle period with each idle connection. Alternatively, the step of maintaining an idle connection metric includes a first step of assigning a number of points to each idle connection the set of connections where the number of points is based on at least one connection characteristic. The points are for indicating the value of a connection in order to maintain persistence of valued connections and to decrease persistence of less-valued connections. The connection characteristic in one arrangement is the type of transaction to be conducted over the idle connection when the idle connection becomes active based on a past transaction over the connection. The connection characteristic, in another arrangement, is the particular server in a server group to which the connection is connected.

In another embodiment the invention, the step of maintaining an idle connection metric involves assigning a number of points to the idle connection where the number of points is adjusted to increase persistence of an idle connection when the idle connection accrues positive characteristics and to decrease persistence of an idle connection when the idle connection accrues negative characteristics. By maintaining an idle connection metric for each idle connection, the system of the present invention is able to selectively drop idle connections. The idle connection metric provides a value to be used as the basis of a decision to drop a particular idle connection.

In another embodiment of the invention, the step of detecting an idle drop condition involves detecting a new connection attempt at the computerized device. In an alternative embodiment of the invention, the step of detecting an idle drop condition involves detecting a new connection attempt at the least one server. In these embodiments of the invention, idle connections at the server are reduced whenever a new connection attempt is made.

In a still further alternative embodiment of the invention, the step of detecting an idle drop condition involves maintaining a ratio of idle connections to active connections followed by the step of detecting whether the ratio exceeds a predetermined ratio threshold. Alternatively, the step of detecting an idle drop condition involves determining whether the idle to active ratio exceeds a maximum idle connection threshold. In one arrangement of the invention, the maximum idle connection threshold is based on a maximum number of connections possible in the at least one server. These embodiments of the invention detect an accumulation of idle connections at the at least one server and operate to reduce number of idle connections when the accumulation becomes too large.

In a still further embodiment of the invention, the step of detecting an idle drop condition involves detecting an increasing rate of new connection attempts at the computerized device implementing the method of the invention. In this embodiment, the method operates to control the number of idle connections when the at least one server becomes busy.

In one embodiment of the invention, the step of performing a connection drop sequence involves dropping at least one idle connection having a longest idle period. In another embodiment of the invention, the step of performing a connection drop sequence involves dropping at least one idle connection based on that idle connection's assigned number of points. The idle connection is dropped, in one arrangement, when the assigned points exceed a predetermined point threshold. In another embodiment of the invention, the step of performing a connection drop sequence involves adjusting a connection timer associated with the at least one idle connection so that the at least one idle connection is dropped more quickly when it becomes idle. Alternatively, the step of performing a connection drop sequence involves incrementing connection timers for new connections. Further alternatively, the step of performing a connection drop sequence involves incrementing connection timers associated with the connections proportionally to the rate of new connection attempts. The various connection drop sequences selectively reduce the number of idle connections by dropping connections according to the idle connection metric associated with the idle connections.

In another embodiment the invention, an idle connection reduction device is implemented in a load balancer managing connections for group of web servers. The idle connection reduction device monitors the connections to the web servers and maintains an idle connection metric for each idle connection. The idle connection reduction device detects a condition to drop idle connections in the load balancer, or alternatively, in the group of web servers, and in response, performs a connection drop sequence according to a connection drop policy based on the idle connection metric. In an alternative embodiment of the invention, the idle connection reduction device is implemented in a content router in a content delivery network in which the servers are content servers. In these embodiments, the idle connection reduction device manages connections across a number of servers.

In another embodiment of the invention, the idle connection reduction device is implemented in a server. In this embodiment, the server manages its own connections.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

In the present invention, an idle connection reduction device selectively reduces the number of idle connections in a computerized device such as a load balancer to improve utilization of a server coupled to the computerized device. In operation, the idle connection reduction device monitors a set of connections to the server. The idle connection reduction device maintains idle connection metrics such as an idle timer for each connection. When the idle connection reduction device detects a condition indicating that idle connections should be dropped, the idle connection reduction device selectively drops connections from the set of connections according to an idle connection drop policy based on the idle connection metric. In an example embodiment, the idle connection reduction device is implemented in a load balancer balancing a number of connections to several web servers. In this example, the idle connection reduction device associates an idle period with each idle connection in the set of connections. The idle connection reduction device also maintains a ratio of idle to active connections to the web servers for the purpose of detecting a condition to drop idle connections. When the ratio becomes too large which, in this example, is the condition indicating that idle connections should be dropped, the idle connection reduction device drops connections according to the idle connection drop policy which is, for example, a policy to drop all connections that have persisted past a preselected period of time and determined from the idle periods associated with the connections.

Figure 1:
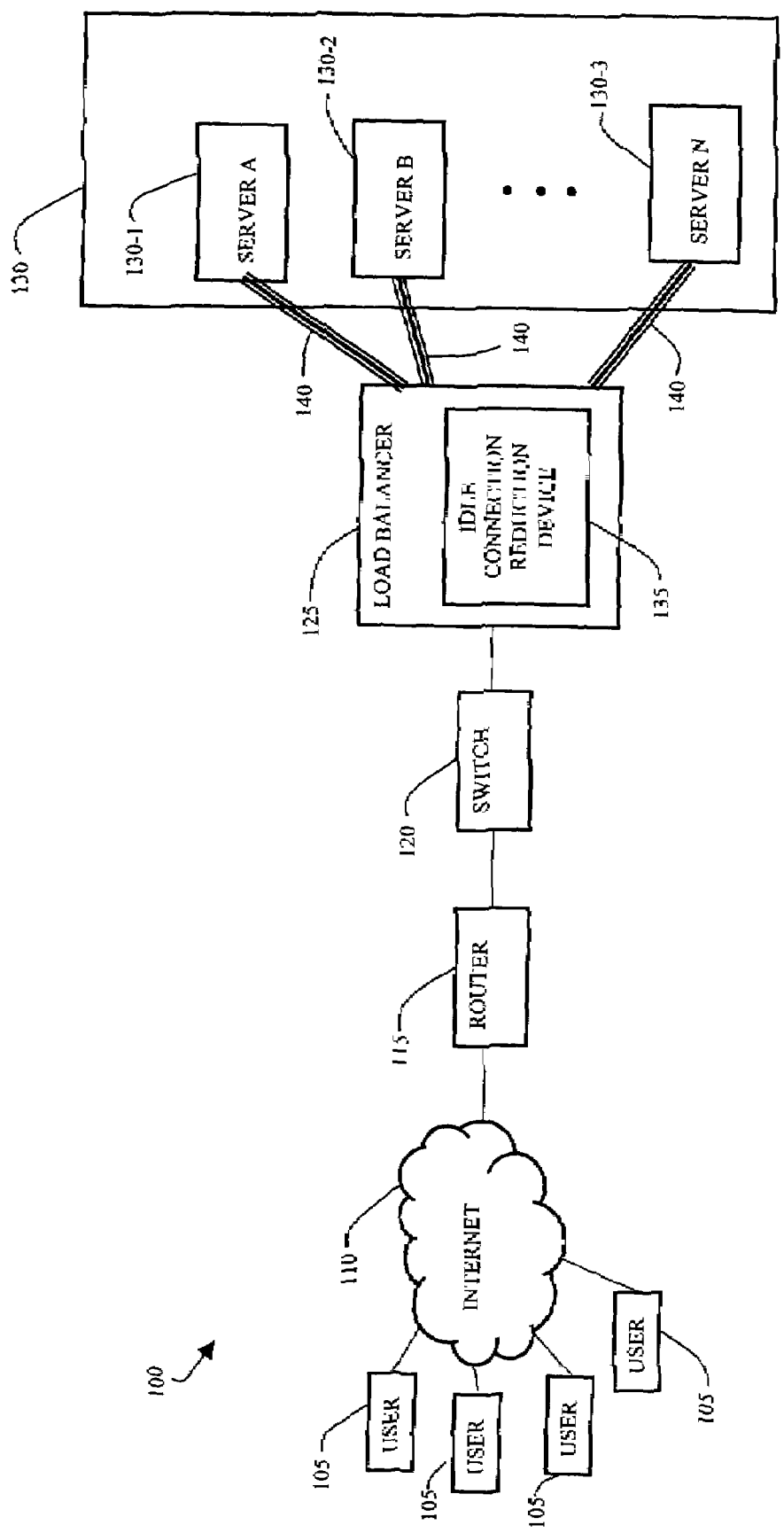
FIG. 1 is a block diagram of a computer network including an idle connection selective reduction device that operates according to the principles of the present invention.

FIG. 1 is a block diagram of an example computer network environment 100 including an idle connection selective reduction device 135 configured to operate according to principles of the present invention. In the example computer network environment 100, a plurality of client computers 105 (clients 105) is connected to the Internet 110. A plurality of servers 130, server A 130-1, server B 130-2, through server N 130-3 is also connected to the Internet 110 through a load balancer 125, a switch 120 and a router 115. In this embodiment, the load balancer 125 includes the idle connection reduction device 135, however the idle connection reduction device 135 could be implemented in any computerized device having connections including the servers 130, the router 115, and the switch 120. The servers 130 are, for example, web servers but could be any type of computerized device handling a plurality of connections 140 to another computerized device. The plurality of connections 140 is also referred to as a set of connections 140.

The clients 105 typically initiate the connections 140 to the servers 130 through the Internet 110. The connections 140 are routed by the router 115, switched through the switch 120 and distributed through the load balancer 125 to the servers 130. The load balancer 125 is, for example, a Layer 7 device that manages connections to a plurality of web servers 130. The load balancer 125 distributes connections among the servers 130 to balance the load on each server 130 but also in some cases determines which server 130 is best to handle a particular connection in order to efficiently service client requests. The load balancer 125 also, in this example, handles idle connections through the idle connection reduction device 135.

Each server 130 handles one or more connections 140. Some connections in the plurality 140 are active, i.e. transmitting data, and some are idle, that is not transmitting data. Another definition of an idle connection is a connection in which there is no data unacknowledged and no request pending. This type of idle occurs in connections having recognizable structure and boundaries such as HTTP connections. In HTTP, a client request and a server response can be matched because requests and responses occur sequentially, in order, with no overlapping and typically requests are not pipelined. Accordingly, an idle HTTP connection has completed expected transactions within the protocol boundaries and has no additional transactions pending. Another definition of an idle connection is a connection that has not been used for transmitting data for a specified period of time. This is the definition of an example idle connection that will be used for the persistent connections discussed in the present invention. As will be described in further detail below, when the server 130 develops a condition where idle connections need to be dropped, for example in order to maintain a certain level of service, the idle connection reduction device 135 applies a connection drop policy in order to selectively drop idle connections.

Figure 2:
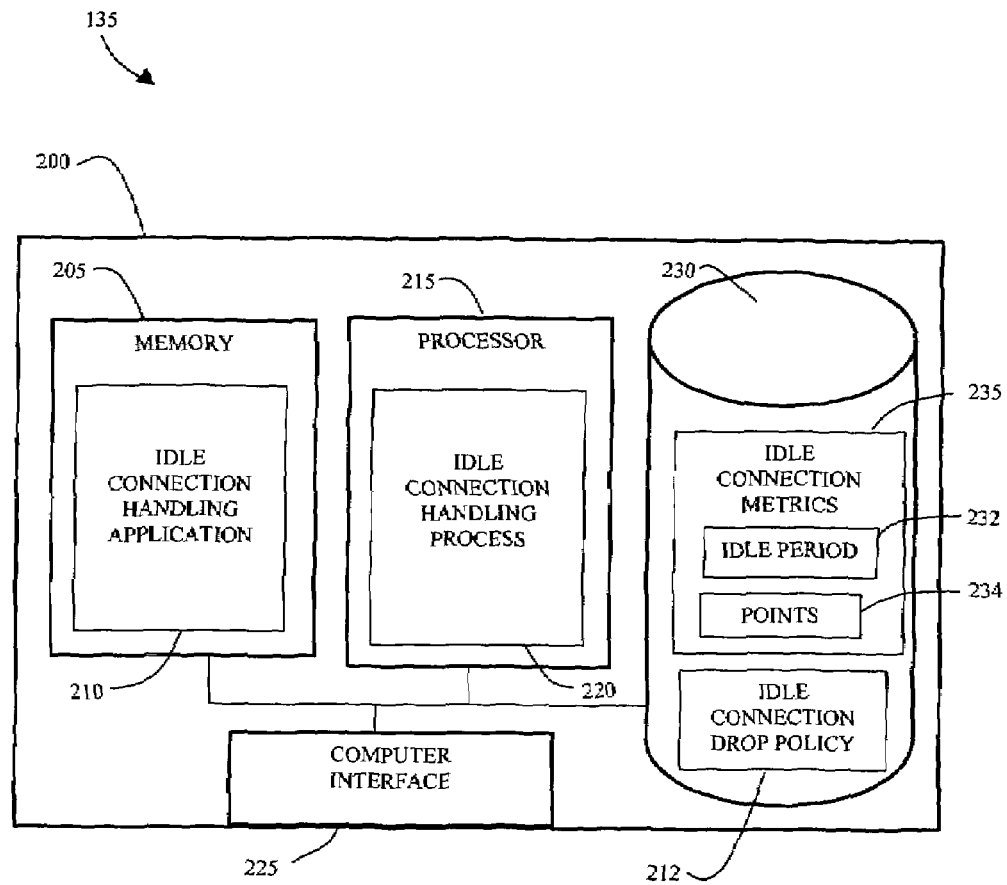
FIG. 2 is a block diagram of the idle connection selective reduction device of FIG. 1 implemented in a computer system.

FIG. 2 is a block diagram of the idle connection reduction device 135 implemented in a computer system 200 having a memory 205, a processor 215, a storage device 230 and a computer interface 225. The computer interface 225 enables the idle connection reduction device 135 to interface to a network, for example, to route, accept, channel or otherwise handle connections 140. The memory 205 has an idle connection handling application 210 that is executed, run or other operated as an idle connection handling process 220 by the processor 215. The idle connection handling process 220 monitors the connections 140 to detect an idle drop condition. The idle connection handling process 220 then operates using an idle connection drop policy 212 based on idle connection metrics 235 to decide which connections to drop when a server 130 develops the condition to drop idle connections. The idle connection metrics include for example, an idle timer 232 (alternatively, an idle period 232) for each persistent connection being handled by the idle connection reduction device 135. In another embodiment of the invention the idle connection metric is a number of points or a weight assigned to an idle connection where the number of points 234 is related to the server handling the connections. Alternatively, the number of points 234 is assigned to an idle connection based upon the type of transaction the idle connection would handle if it were to become active based on one or more past transactions. In an example embodiment of the invention, more points are assigned to a connection carrying a secure web transaction such as a sales transaction than to a connection downloading a web page graphic. The idle connection metrics 235 are alternatively stored in the memory 205. The idle connection handling process 220 then selectively drops idle connections according to the idle connection drop policy 212 according to the idle connection metrics.

Figure 3:
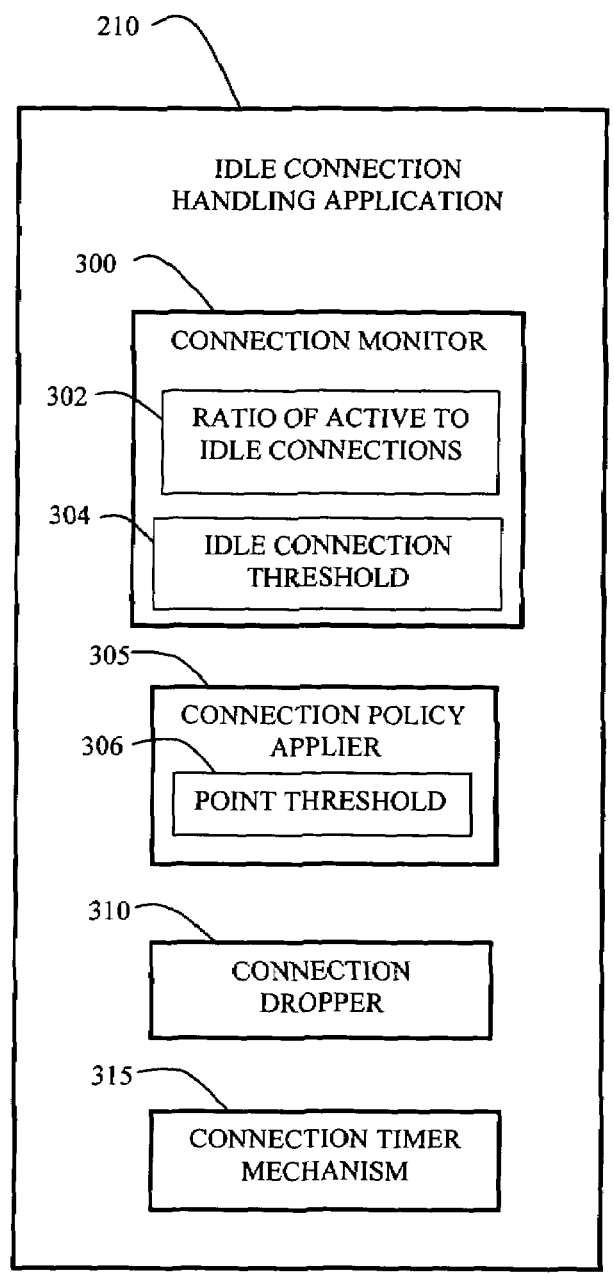
FIG. 3 is a block diagram of the idle connection selective reduction application of FIG. 2.

FIG. 3 is a block diagram of the idle connection handling application 210. The idle connection handling application 210 includes a connection monitor 300, a connection policy applier 305, a connection dropper 310, and a connection timer mechanism 315.

The connection monitor 300, in one arrangement of the invention, monitors the connections at a server, for example server A 130-1. In another arrangement of the invention, the connection monitor 300 monitors connections at a data communications device handling connections to the servers 130 such as the load balancer 135. The connection monitor 300 monitors the plurality of connections 140 for idle persistent connections and also monitors the plurality of connections 140 for a condition to drop idle connections.

There are a number of different conditions that are used in various embodiments to the idle connection reduction device to apply the connection drop policy to drop connections. In one embodiment of the invention, a condition to drop idle connections is a new connection attempt directed at one of the computerized devices being monitored by the connection monitor 300, such as, the server 130-1 or the load balancer 135. In one embodiment of the invention, the connection monitor 300 waits until a threshold number of connections is reached before signaling an idle drop condition with each new connection attempt. In another embodiment of the invention, the connection monitor 300 signals an idle drop condition to the idle connection policy applier 305 with each new connection attempt.

In another embodiment of the invention, the condition to drop idle connections includes maintaining a ratio of idle connections to active connections in the plurality of connections 140 and the condition to drop is that the ratio exceeds a predetermined ratio threshold. In another embodiment the invention, the condition to drop idle connections develops when a ratio 302 of idle connections to active connections exceeds a maximum idle connection threshold 304. The maximum idle connection threshold 304 in a first arrangement is based on a network efficiency determination. The maximum idle connection threshold 304 in the second arrangement is based on a maximum number of connections possible to the computerized device being monitored by the connection monitor 300. In a still further embodiment of the invention, the condition to drop idle connections is a condition of an increasing rate of new connection requests at the computerized device being monitored.

The connection monitor 300 additionally monitors the plurality of connections 140 for idle connection metrics 235. As mentioned above, in one embodiment of the invention, the idle connection metric is an idle period 232 for each connection as timed by the connection timer mechanism 315. In another embodiment of the invention, the idle connection metric is a number of points 234 assigned to each connection based on various factors which will be described below. Once the idle connection reduction device detects a condition to drop idle connections, the idle connection reduction device uses the metrics associated with the connections to decide which connections to drop or to adjust in order to cause certain connections to be dropped earlier than any time-out period set in, for example, a server handling the connections.

The connection policy applier 305 applies the idle connection drop policy 212 when the connection monitor 300 detects a condition to drop idle connections described above. In one embodiment, the idle connection drop policy 212 involves resetting the idle period 232 associated with each idle connection so that idle connections are dropped more quickly. In another embodiment the invention, the idle connection drop policy 212 sets the idle period 232 associated with new connections to drop more quickly when they become idle. Resetting the idle period 232 associated with an idle connection involves, in one arrangement, adding time to an idle period where the connection monitor 300 counts up to maximum idle. In another arrangement, resetting the idle period 232 involves decreasing time to an idle period where the connection monitor 300 counts down. In an embodiment of the invention where the idle connection reduction device 135 is implemented in a server 130, resetting the idle period 232 involves resetting the idle time set for all connections to the server 130. In another embodiment of the invention, the idle connection drop policy 212 is a policy to drop the oldest idle connections. In implementing this embodiment in a computerized device connected to a server, a further embodiment of the invention includes providing the computerized device with the connection management policy of the server.

In a still further embodiment of the invention, the idle connection drop policy 212 is a policy to drop idle connections having a deficient number of points 234 assigned to the connections in accordance with connection favorability. A factor of favorability in one arrangement of the invention is a connection to a particular server, and in another arrangement, is a connection handling a particular type of transaction. As an example of these aspects of this invention, certain connections such as secure web transactions are valued more highly than a typical web page download transaction. In one embodiment of the invention, then, a connection handling a secure web transaction is assigned more points than a web page download connection. Accordingly, the connection carrying the secure web transaction in this example would tend to persist longer than the web download connection. In a further alternative arrangement of the invention, the idle connection drop policy 212 compares the number of points 234 to a connection point threshold 306 to determine which connections to drop. In this manner, the idle connection drop policy 212 enables the idle connection reduction device to selectively drop connections when a condition to drop idle connections is detected.

The connection dropper 310 selectively drops idle connections according to the idle connection drop policy 212 as determined by the connection policy applier 305.

Figure 4:
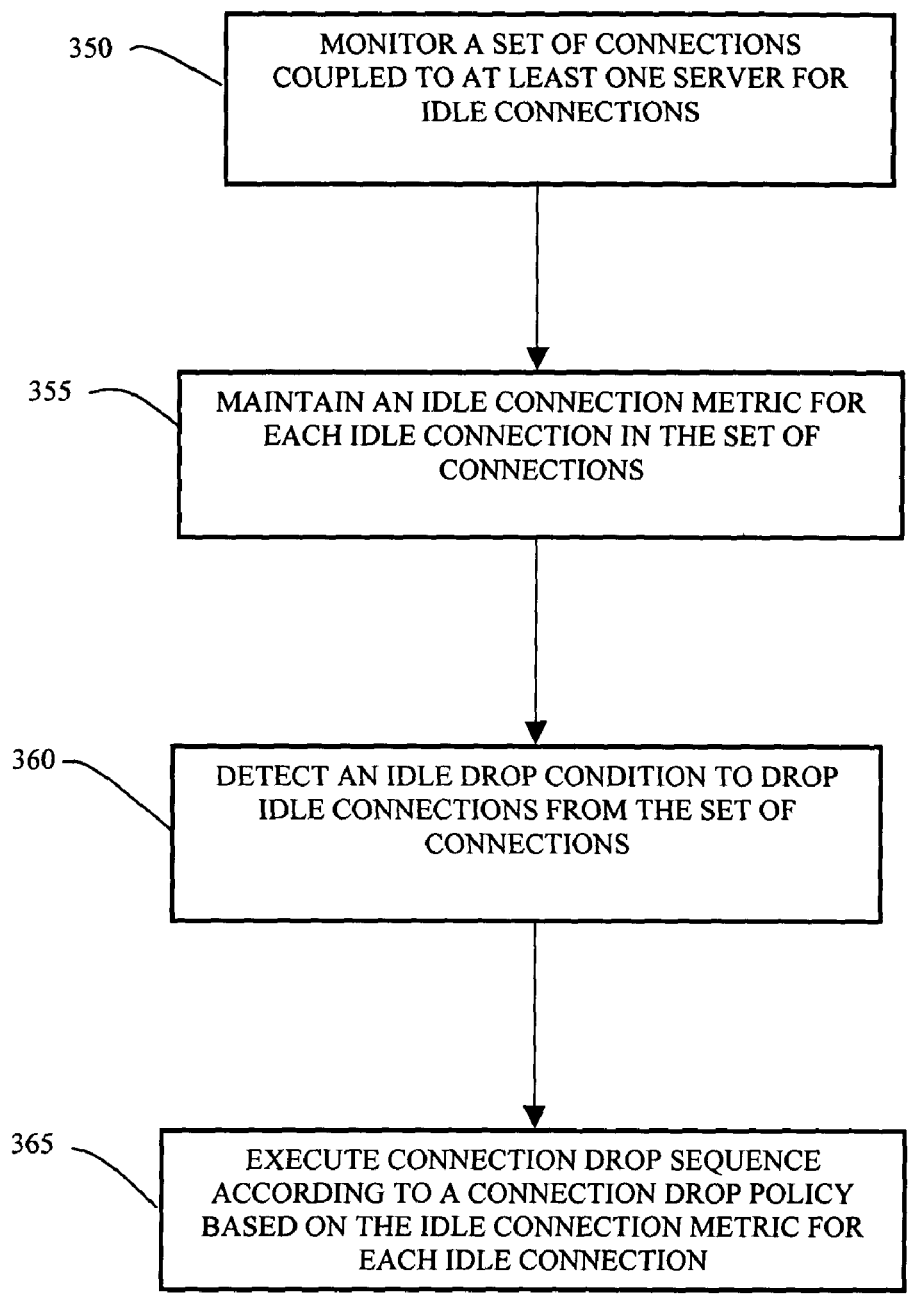
FIG. 4 is a flow chart of the operation of the idle connection selective reduction device of FIG. 1.

FIG. 4 is a flow chart of an example operation of the idle connection reduction device 135 according to one embodiment of the present invention. Details of these steps are further explained below with respect to FIGS. 5-8.

At step 350, the idle connection reduction device 135 monitors the set of connections 140 coupled to least one server 130 for idle connections. At step 355, the idle connection reduction device 135 maintains an idle connection metric 235 for each idle connection in the set of connections 140. At step 360, the idle connection reduction device 135 detects an idle drop condition to drop idle connections from the set of connections 140. In step 365, the idle connection reduction device 135 executes a connection drop sequence to selectively drop idle connections according to the idle connection drop policy 212 based on the idle connection metric 235 for each idle connection. By applying a connection drop policy based upon the idle connection metrics upon the occurrence of an idle drop condition, the idle connection reduction device 135 is able to selectively drop idle connections. The idle connection reduction device 135 retains some idle connections in order to enable a server to take advantage of the benefits of persistent connections while dropping some idle connections to maintain server efficiency. The idle drop condition enables the idle connection reduction device 135 to decide when the idle connection drop policy should be applied in order to drop idle connections in a controller manner, so that idle connections are maintained when they are useful and are dropped when they have persisted past usefulness.

Figure 5:
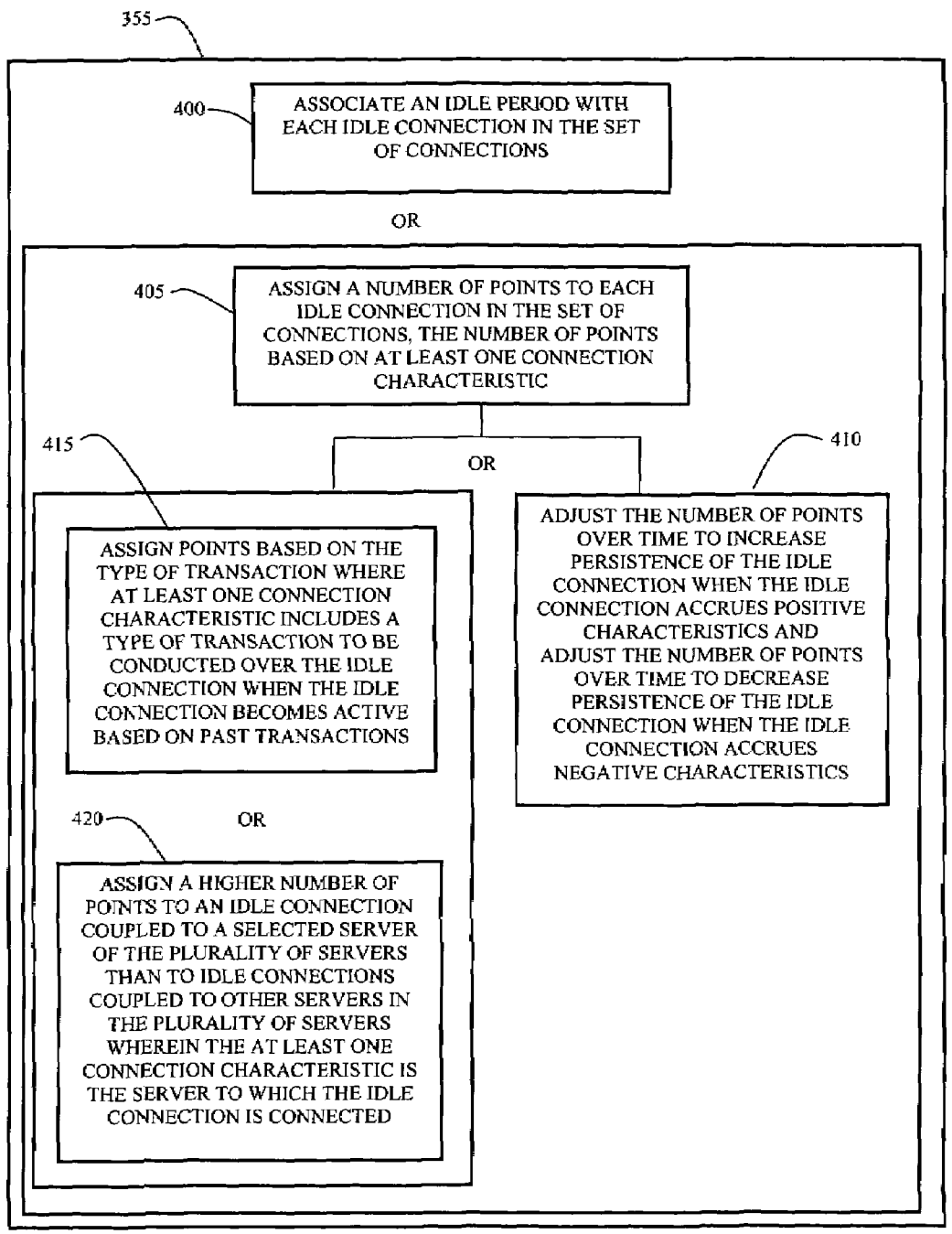
FIG. 5 is an expansion of the method step of maintaining an idle connection metric from the flow chart of FIG. 4.

FIG. 5 shows an expansion of step 355 of FIG. 4, the method step of maintaining an idle connection metric 235 for each idle connection in the set of connections 140. In one embodiment of the invention, step 400, the idle connection reduction device 135 associates an idle period 232 with each idle connection in the set of connections 140. The idle period 232 is timed by the connection timer mechanism 315 is stored in the storage device 230. The idle period 232 is a period of idle time associated with a connection. The idle period 232 in one embodiment of the invention is essentially a timer where time is added as the connection remains idle for some time. In one embodiment of the invention, when the idle period 232 reaches a preselected threshold, the idle connection becomes eligible to be dropped when the idle connection drop policy is applied. The idle period 232 in another embodiment of the invention is a count-down timer where an initial time is assigned to the connection which is set as the idle period 232. As the connection remains idle over time, the idle period 232 counts down until becomes zero. At that point in this example, the idle connection becomes eligible to be dropped as its time has expired. In various embodiments of the invention, the idle connection reduction device 135 effectively drops connections by resetting the idle periods associated with those connections either by adding or subtracting time from the idle periods in order to drop the connections more quickly.

In another embodiment of the invention, in step 405, the idle connection reduction device 135 assigns a number of points 234 to each idle connection in the set of connections 140 where the number of points 234 is based on at least one connection characteristic. Examples of connection characteristics include whether a user authentication operation has taken place on the connection, and if such an operation has taken place, the identity of the user, or alternatively, the class of the user. In one example, the connection characteristic is a type of transaction to be conducted over the idle connection when the connection becomes active based on one or more past transactions. In that example, in step 415, then, the idle connection reduction device 135 assigns points to idle connections based on transaction type such as a sales transaction, or for example, a priority read transaction. In an alternative further arrangement of the invention, step 420, the connection characteristic is a particular server 130 to which the connection is connected. In step 420, then, the idle connection reduction device 135 assigns points to idle connections based upon which server of a plurality of servers 130 to which the connections are connected. For example, the connection to a server handling sales from a web site would receive points making the connection more favorable (that is, less susceptible to being dropped) than other servers not handling sales data transactions.

In still another arrangement of the invention, step 405 further comprises step 410 where the idle connection reduction device 135 adjusts the number of points assigned to each idle connection over time to increase persistence of the idle connection when the idle connection accrues positive characteristics. Also at step 410, the idle connection reduction device 135 adjusts the number of points assigned to each idle connection over time to decrease persistence of the idle connection when the idle connection accrues negative characteristics. An example of a basis to increase and decrease assigned points to a certain connection is a scheme where points are assigned based on whether a connection is currently transmitting data, is newly idle, or has been idle for some time. In this example, a connection transmitting data is assigned points, a newly idle connection is decremented by some points, while a connection idle for some time would be decremented by more points. Another basis for adjusting the number of points is according to the type of request being handled by the connection. The points serve as an idle connection metric in this example embodiment.

Figure 6:
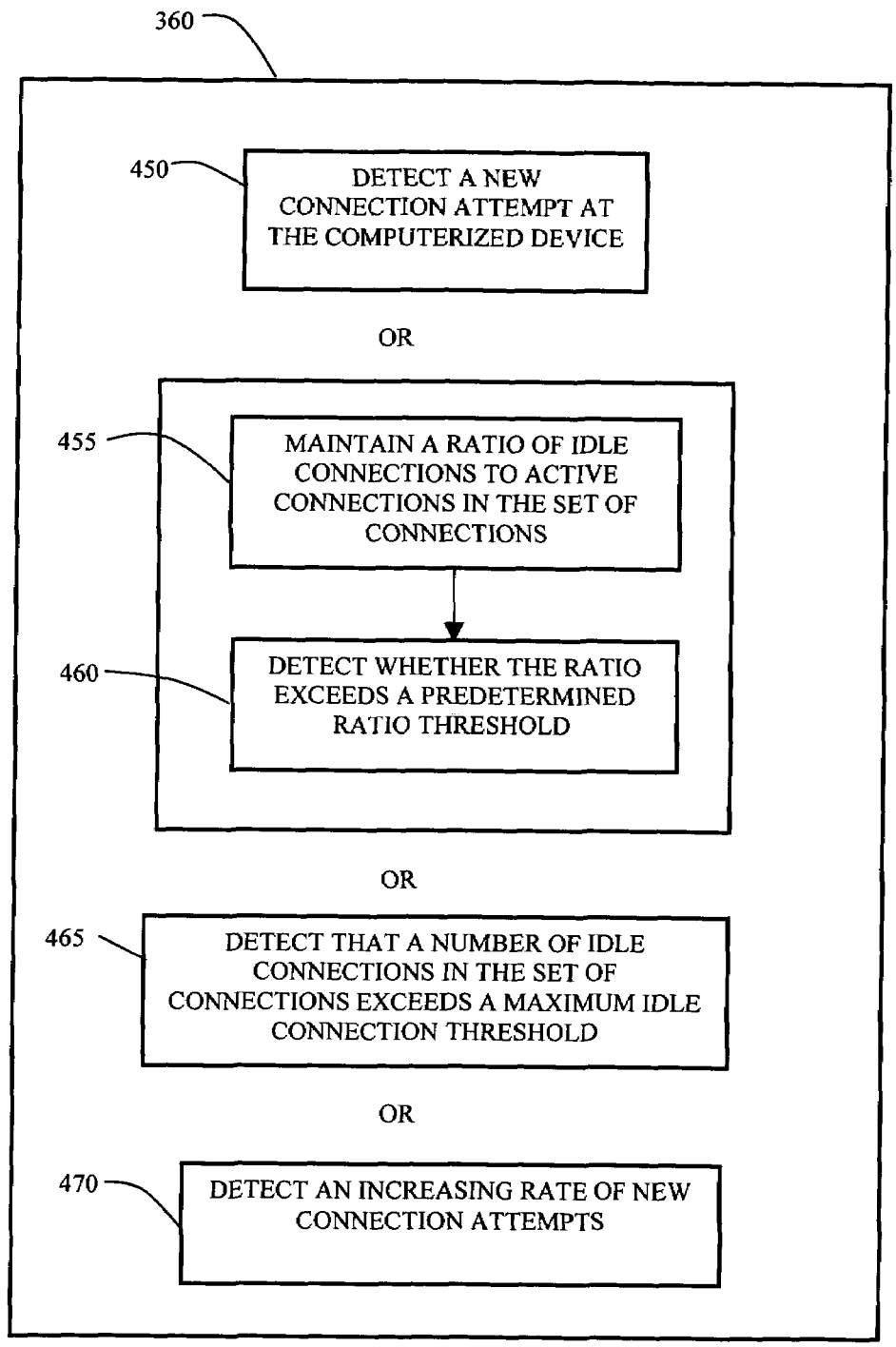
FIG. 6 is an expansion of the method step of detecting an idle drop condition from the flow chart of FIG. 4.

FIG. 6 is an expansion of step 360 of FIG. 4, the method step of detecting an idle drop condition. In one embodiment of the invention, at step 450, the idle connection reduction device 135 detects a new connection attempt at the computerized device. Alternatively, the idle connection reduction device 135 executes step 455 in which the idle connection reduction device 135 maintains a ratio 302 of idle connections to active connections in the set of connections 140 to the computerized device at which the idle connection reduction device 135 is handling connections. At step 460, the idle connection reduction device 135 than detects whether the ratio 302 of idle to active connections exceeds a predetermined ratio threshold 304. In another embodiment of the invention, at step 465, the idle connection reduction device 135 detects that the number of idle connections in the set of the connections 140 exceeds a maximum idle threshold 304. The maximum idle threshold 304 in one arrangement of the invention is a number based on a maximum number of connections that the server 130 is capable of handling at one time. In alternative arrangements of the invention, the maximum idle threshold 304 may be based on other factors. In still another embodiment of the invention, at step 470, the idle connection reduction device 135 detects an increasing rate of new connections attempts.

Figure 7:
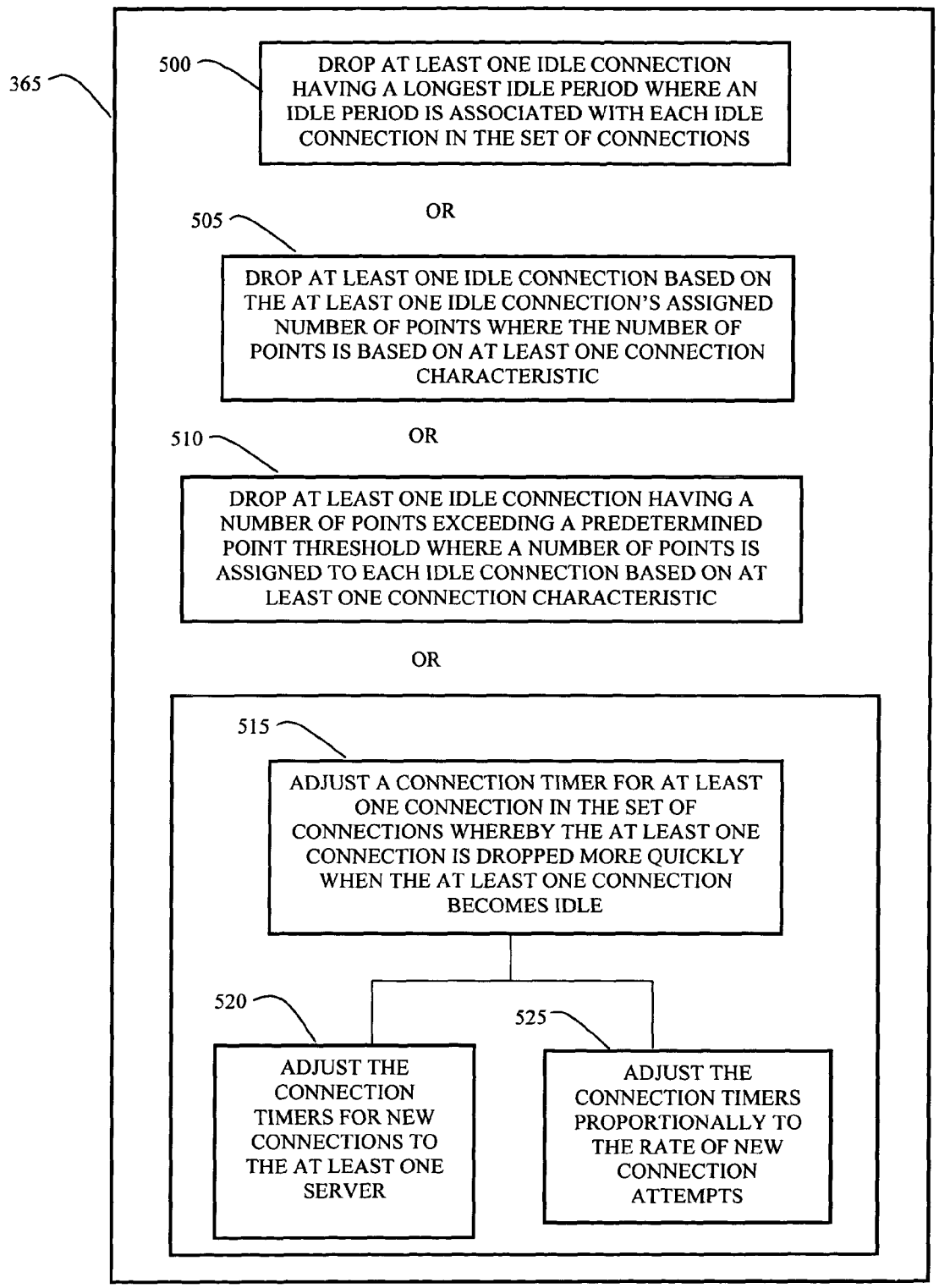
FIG. 7 is an expansion of the method step of executing a connection drop sequence according to a connection drop policy from the flow chart of FIG. 4.

FIG. 7 is an expansion of step 365 of FIG. 4, the method step of executing a connection drop sequence according to a connection drop policy 212. In one embodiment of the invention, in step 500, the idle connection reduction device 135 drops at least one idle connection having a longest idle period 232 where each idle connection in the set of connections 140 has an associated idle period 232. In an alternative embodiment of the invention, in step 505, the idle connection reduction device 135 drops at least one idle connection based on the number of points 234 assigned to each idle connection where the number of points 234 is based on at least one connection characteristic such as type of transaction carried by the connection or the particular server to which the connection is connected. In another alternative embodiment of the invention, in step 510, the idle connection reduction device 135 drops at least one idle connection having a number of points 234 exceeding a predetermined point threshold 306 where the number of points 234 assigned to each idle connection is based on at least one connection characteristic. In another alternative embodiment of the connection, in step 515, the idle connection reduction device 135 adjusts a connection timer, for example the idle period 232, for at least one connection in the set of connections 140 where the at least one connection is dropped more quickly than originally intended. In an alternative arrangement, in step 520, the idle connection reduction device 135 adjusts the connection timers 232 for new connections to the computerized device, that is the server 130-1 or the load balancer 125, made after the idle drop condition has been detected. In another arrangement of the invention, in step 525, the idle connection reduction device 135 adjusts the connection timer of the at least one connection of step 515 proportionally to the rate of new connection attempts.

Figure 8:
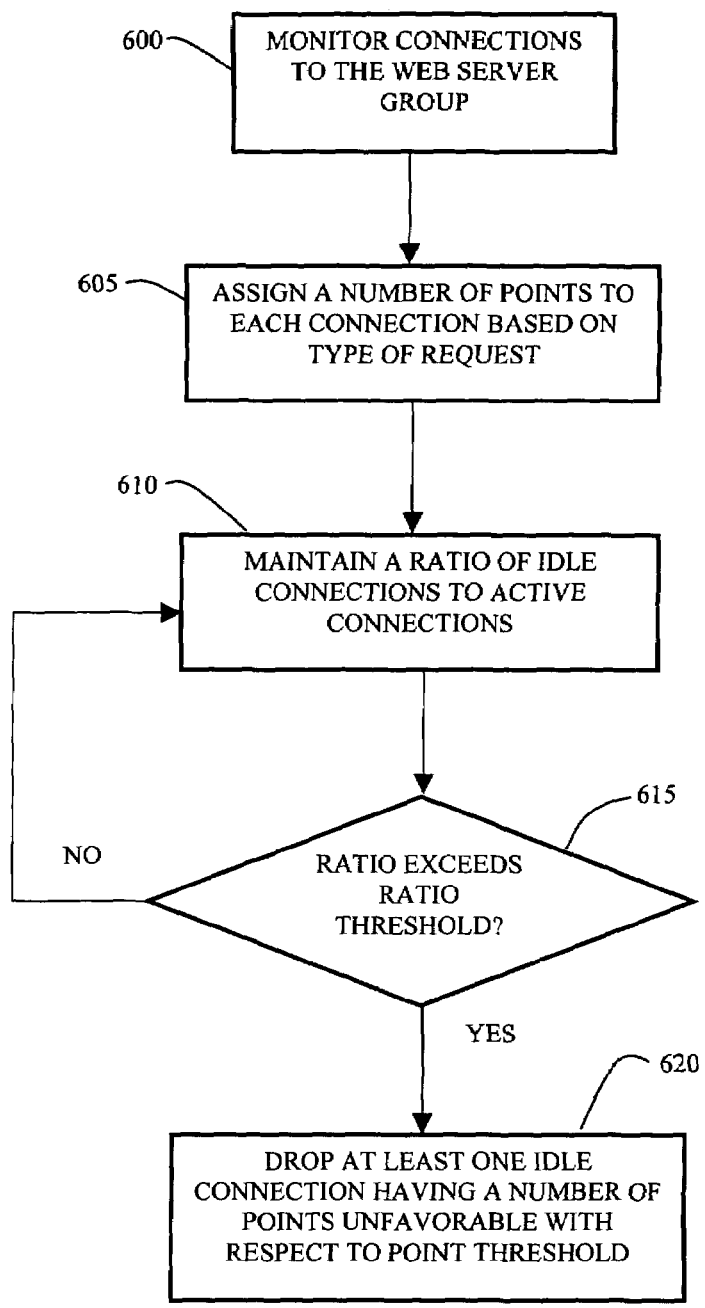
FIG. 8 is a flow chart of the idle connection selective reduction device of FIG. 1 operating in a load balancer coupled to a group of web servers.

FIG. 8 is a flow chart of an example implementation of the present invention where the idle connection reduction device 135 is implemented in a load balancer 125 coupled to a group of web servers 130 as shown in the computer environment 100 of FIG. 1.

At step 600, the idle connection reduction device 135 monitors connections 140 to the web servers 130 at the load balancer 125. The idle connection reduction device 135 monitors the connections 140 for idle connections and also for a condition to drop idle connections as described above with regard to FIG. 3.

At step 602, the idle connection reduction device 135 assigns a number of points 234 to each connection based on the type of request (alternately referred to as the type of transaction) carried by the connection. The number of points 234 is the idle connection metric in this example embodiment. For example, a request having to do with a web site purchase receives more points than a request for an information web page where a connection having a greater number of points is favored over connections having fewer points. Accordingly, idle connections having a greater number of points are allowed, generally, to persist longer than connections having fewer points when a condition to drop idle connections is detected because the idle connection reduction device 135 drops least favored connections first. Alternatively, the idle connection reduction device 135 assigns points based on browser type as indicated in an HTTP header of a request carried by the connection. Further alternatively, the idle connection reduction device 135 assigns points to each connection based on observed bandwidth of a connection when data is flowing over the connection. In the alternative embodiments, connections that are relatively more costly for clients to re-establish if lost could be made more persistent than connections that are easily re-established. For example, the set up time for a Secure Sockets Layer (SSL) connection or a connection from a slow device such as a cell phone or a personal digital assistant is greater than the set up time for a non-SSL HTTP connection over a fast Internet access device.

At step 610, the idle connection reduction device 135 maintains a ratio of idle connections to active connections in order to detect a condition to drop idle connections. In this embodiment, the idle connection reduction device 135 has an idle connection threshold 304 to which the idle connection reduction device 135 compares the ratio 302 of idle to active connections. Also, in this embodiment, the ratio 302 of idle to active connections is the ratio 302 of idle connections in the group of servers 130 to active connections in the group of servers 130. In an alternative embodiment of the invention, the idle connection reduction device 135 maintains a ratio 302 of active to idle connections for each server in the group of servers 130.

At step 615, the idle connection reduction device 135 detects whether the ratio 302 exceeds the threshold 304. If the ratio 302 does not exceed the threshold, the idle connection reduction device 135 does not detect a condition to drop idle connections and continues to maintain the ratio 302 of idle to active connections, step 610. If the ratio 302 does exceed the threshold, the idle connection reduction device 135 does detect a condition to drop idle connections and proceeds to step 620.

At step 620, the idle connection reduction device 135 drops at least one idle connection from the set of connections 140. In this example embodiment, the idle connection reduction device 135 has a point threshold 306. The idle connection reduction device 135 compares the number of points 234 assigned to each idle connection to the point threshold 306 and drops at least one idle connection having a number of points unfavorable with respect to the point threshold. For example, the idle connection reduction device 135 drops idle connections having a number of points 234 less than the points threshold 306. In this way, idle connections are dropped selectively when a condition to drop idle connections develops. Those connections that are defined as potentially more useful, by the number of points 234, are allowed to persist longer than less useful idle connections.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an idle connection reduction device that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with an idle connection reduction device that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. In a computerized device, a method of improving efficiency of at least one server, comprising:
    monitoring a set of connections coupled to the at least one server for idle connections;
    maintaining an idle connection metric for each idle connection in the set of connections, the idle connection metric indicating a value of the idle connection, the value based on at least one connection characteristic of the idle connection;
    detecting in the computerized device an idle drop condition to drop one or more idle connections from the set of connections; and
    in response to detecting the idle drop condition, performing a connection drop sequence according to a connection drop policy based on the idle connection metric for each idle connection.

2. The method of claim 1 wherein maintaining an idle connection metric further comprises associating an idle period with each idle connection in the set of connections.

3. The method of claim 2 wherein performing a connection drop sequence further comprises dropping at least one idle connection having a longest idle period.

4. The method of claim 1 wherein the idle connection metric includes a number of points assigned to the idle connection, the number of points based on the at least one connection characteristic of the idle connection.

5. The method of claim 4 wherein performing a connection drop sequence further comprises dropping at least one idle connection based on the at least one idle connection's assigned number of points.

6. The method of claim 4 wherein performing a connection drop sequence further comprises dropping at least one idle connection having a number of points exceeding a predetermined point threshold.

7. The method of claim 4 further comprising:
    adjusting the number of points over time to increase persistence of the idle connection when the idle connection accrues positive characteristics; and
    adjusting the number of points over time to decrease persistence of the idle connection when the idle connection accrues negative characteristics.

8. The method of claim 1 wherein detecting an idle drop condition further comprises detecting a new connection attempt at the computerized device.

9. The method of claim 1 wherein detecting an idle drop condition further comprises:
    maintaining a ratio of idle connections to active connections in the set of connections; and
    detecting whether the ratio exceeds a predetermined ratio threshold.

10. The method of claim 1 wherein detecting an idle drop condition further comprises detecting that a number of idle connections in the set of connections exceeds a maximum idle connection threshold.

11. The method of claim 10 wherein the maximum idle connection threshold is based on a maximum number of connections possible in the at least one server.

12. The method of claim 1 wherein detecting an idle drop condition further comprises detecting an increasing rate of new connection attempts at the computerized device.

13. The method of claim 1 wherein performing a connection drop sequence further comprises adjusting a connection timer for at least one connection in the set of connections whereby the at least one connection is dropped more quickly when the at least one connection becomes idle.

14. The method of claim 13 wherein adjusting the connection timer further comprises incrementing the connection timers for new connections to the at least one server.

15. The method of claim 13 wherein adjusting the connection timer further comprises incrementing the connection timer proportionally to a rate of new connection attempts.

16. The method of claim 1 wherein the computerized device is a web server.

17. The method of claim 1 wherein the computerized device is a data communications device, wherein monitoring a set of connections further comprises monitoring a set of connections connected through the data communications device to a web server and wherein performing a connection drop sequence further comprises performing a connection drop sequence in the data communications device whereby the efficiency of the web server is improved by dropping idle connections and further by performing the connection drop sequence at the data communications device rather than at the web server.

18. The method of claim 1 wherein the computerized device is a content router in a content delivery network.

19. In a computerized device, a method of improving efficiency of at least one server, comprising:
    monitoring a set of connections coupled to the at least one server for idle connections;
    maintaining an idle connection metric for each idle connection in the set of connections;
    detecting in the computerized device an idle drop condition to drop idle connections from the set of connections; and
    in response to detecting the idle drop condition, performing a connection drop sequence according to a connection drop policy based on the idle connection metric for each idle connection,
    wherein maintaining an idle connection metric further comprises assigning a number of points to each idle connection in the set of connections, the number of points based on at least one connection characteristic and wherein the at least one connection characteristic includes a type of transaction to be conducted over the idle connection when the idle connection becomes active and wherein the number of points assigned to each idle connection in the assigning step is based on the type of transaction to be conducted over the idle connection.

20. In a computerized device, a method of improving efficiency of at least one server in a plurality of servers, comprising:
    monitoring a set of connections coupled to the at least one server for idle connections;
    maintaining an idle connection metric for each idle connection in the set of connections;
    detecting in the computerized device an idle drop condition to drop idle connections from the set of connections; and
    in response to detecting the idle drop condition, performing a connection drop sequence according to a connection drop policy based on the idle connection metric for each idle connection,
    wherein maintaining an idle connection metric further comprises assigning a number of points to each idle connection in the set of connections, the number of points based on at least one connection characteristic, and
    wherein assigning a number of points to each idle connection further comprises assigning a higher number of points to an idle connection coupled to a selected server in the plurality of servers than to idle connections coupled to other servers in the plurality of servers.

21. An apparatus for managing connections, comprising:
    a connection interface;
    a memory; and
    a controller coupled to the memory and to the connections interface, the controller configured to:
    (a) monitor a set of connections coupled to the connection interface for idle connections, to maintain in the memory an idle connection metric for each idle connection in the set of connections, the idle connection metric indicating a value of the idle connection, the value based on at least one connection characteristic of the idle connection,
    (b) detect an idle connection condition to drop idle connections, and
    (c) in response to detecting the idle drop condition, perform a connection drop sequence according to a connection drop policy based on the idle connection metric for each idle connection.

22. An apparatus as defined in claim 21 wherein the controller is further configured to:
    associate an idle period with each idle connection in the set of connections.

23. An apparatus as defined in claim 22 wherein the controller is further configured to:
    drop at least one idle connection having a longest idle period.

24. An apparatus as defined in claim 21 wherein
    the idle connection metric includes a number of points assigned to the idle connection, the number of points based on the at least one connection characteristic of the idle connection.

25. An apparatus as defined in claim 24 wherein the controller is further configured to:
    drop at least one idle connection based on the at least one idle connection's assigned number of points.

26. An apparatus as defined in claim 24 wherein the controller is further configured to:
    drop at least one idle connection having a number of points exceeding a predetermined point threshold.

27. An apparatus as defined in claim 24 wherein the controller is further configured to:
    adjust the number of points over time to increase persistence of the idle connection when the idle connection accrues positive characteristics, and
    adjust the number of points over time to decrease persistence of the idle connection when the idle connection accrues negative characteristics.

28. An apparatus as defined in claim 24 wherein the at least one connection characteristic includes a type of transaction to be conducted over the idle connection when the idle connection becomes active and wherein the number of points assigned to each idle connection is based on the type of transaction to be conducted over the idle connection.

29. An apparatus as defined in claim 24 wherein the set of connections is coupled to at least one server in a plurality of servers a higher number of points are assigned to an idle connection coupled to a selected server in the plurality of servers than to idle connections coupled to other servers in the plurality of servers.

30. An apparatus as defined in claim 21 wherein the controller is further configured to:

maintain a ratio of idle connections to active connections in the set of connections, and detect whether the ratio exceeds a predetermined ratio threshold.

31. An apparatus as defined in claim 21 wherein the controller is further configured to:

detect an increasing rate of new connection attempts at the computerized device.

32. A computer program product having a computer-readable medium including computer program logic encoded thereon that, when performed in a computerized device having a processor, programs the processor to perform the operations of:

monitoring a set of connections coupled to the at least one server for idle connections;

maintaining an idle connection metric for each idle connection in the set of connections, the idle metric indicating a value of the idle connection, the value based on at least one connection characteristic of the idle connection;

detecting in the computerized device an idle drop condition to drop idle connections from the set of connections; and in response to detecting the idle drop condition, performing a connection drop sequence according to a connection drop policy based on the idle connection metric for each idle connection.

* * * * *